AUTOMATIC AMPLITUDE CONTROL FOR TELEVISION SYSTEMS

Filed Oct. 27, 1954

INVENTORS
John R. Kruse, Jr.
Robert S. Hudson.
BY
Harness, Dickey & Pierce.
ATTORNEYS.

2,978,537

AUTOMATIC AMPLITUDE CONTROL FOR TELEVISION SYSTEMS

John R. Kruse, Jr., and Robert S. Hudson, Lancaster, Ohio, assignors to Diamond Power Specialty Corporation, Lancaster, Ohio, a corporation of Ohio Filed Oct. 27, 1954, Ser. No. 464,955

14 Claims. (Cl. 178—6.8)

This invention relates to television systems and more particularly to automatic control apparatus for television systems.

An object of this invention is to improve the quality of the viewed image on a television screen.

Another object of this invention is to maintain a substantially constant image brightness on a viewing screen despite substantial variations in object illumination.

A further object of this invention is to present upon a television viewing screen the maximum amount of information for any degree of televised-scene illumination and to communicate the maximum intelligence in spite of gradual or abrust changes in that illumination level.

A feature of this invention is a means for preventing the exposure of light-responsive electrical equipment to extraordinarily high levels of illumination from resulting in overload of the equipment or any portion thereof.

Another feature of this invention is a means for preventing gradual or abrupt changes in scene illumination from degrading the quality of a visible reproduction of that scene.

Another feature of this invention is a means for electrically reproducing to a compressed or expanded scale the relative step-contrast ratios which are present in any usable background ranges of scene-illumination.

Another feature of this invention is a means for modulating the amplitude of a video output signal as a function of the average amplitude of an input signal.

Another feature of the invention is a means for electrically biasing a television camera tube as a function of the amplitude of the output signal therefrom.

In television systems, care must be exercised not only to control the scene-illumination within finite limits but also to prevent sudden changes in the light level. As is well known, abrupt reduction in the level of scene-illumination produces, at least until compensation is made therefor, an indistinct image normally referred to as "blackout," and, conversely, abrupt increases in scene-illumination, particularly those changes which produce an overload of any element in the equipment, produce "bloom" or "washout" of the picture.

Industrial television systems are particularly subjected to violent fluctuations in light levels and in many applications the condition most warranting scrutiny produces or is accompanied by such changes, impairing or preventing accurate viewing of the condition.

Through the application of the principles of this invention, gross variations in image brightness, and the resultant reduction of the information-transmitting capability of the system, may be eliminated. In general, this is accomplished by sensing the amplitude of the alternating-current output signal from a television camera tube, or an amplified version thereof, and developing a direct voltage therefrom controlling or serving as the supply voltage for one or more of the camera-tube electrodes, or controling one or more other stages of amplification. Means are also provided for functionally relating the amplitude of the direct voltage to an average or integrated value, over a selectable time interval, of the alternating-current signal. Means are also employed for developing a control voltage which is a conjoint function of the amplitude of two alternating-current signals.

The precise manner in which the foregoing objects and features are attained and other objects and features of the invention will be apparent from consideration of the following detailed description of an embodiment of the invention when read with reference to the accompanying drawings in which.

Figure 1:
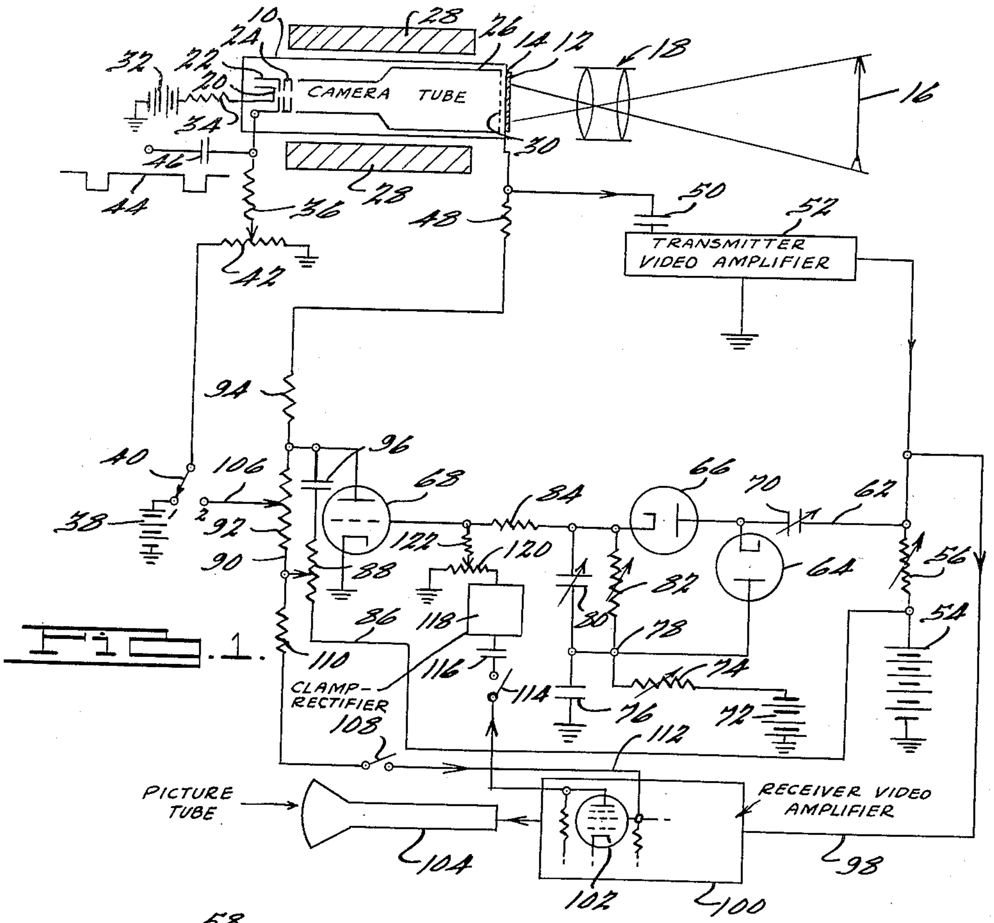
Figure 1 is a schematic representation, partially in block diagrammatic form, of a system embodying the principles of the invention.

Referring now to the circuit of Fig. 1 of the drawings, a target type of camera or pick-up tube 10 is employed. Tube 10 may take any of a plurality of forms, the primary requirement being that it be capable of producing an output signal the amplitude of which is controllable by varying the direct voltage applied to at least one of its electrodes or by varying the bias voltage between a pair of its electrodes. The type 6198 Vidicon is one example of a suitable camera tube.

Tube 10 comprises an envelope terminating in a transparent face plate 12 to which is juxtaposed or adhered a composite film comprising a conductive layer 14, serving as a signal-output electrode, and a photoconductive layer deposited thereon. An image of the illuminated object 16 to be televised is focused upon the photoconductive layer by means of an optical lens 18, creating potential changes in the photoconductive layer. The photoconductive layer is scanned by an electron beam produced by a cathode 20, controlled by a first grid 22, accelerated by a second grid 24, and focused, aligned, and deflected by means of a focusing grid 26 and an alignment coil, focusing coil and deflecting coil conjointly represented by coil 28. A fourth grid 30 is biased to establish a decelerating field both to reduce the velocity of the electron beam and to insure that the beam approaches each element of the photoconductive surface perpendicularly.

Suitable operating currents are applied to the coils 28 and suitable operating voltages are applied to the accelerating grid 24, to the decelerating grid 30 and focusing grid 26, and to the tube filaments in a manner known in the art.

The cathode 20 is connected to a suitable source of positive voltage 32 through a resistor 34, the cathode voltage being elevated above ground by an amount at least equal to the maximum control-grid to cathode bias required, for a purpose hereinafter to be noted. An adjustable direct voltage is applied to the control grid 22 through resistor 36 from a voltage-divider comprising positive battery 38, switch 40 (when that switch is in engagement with its No. 1 contact), potentiometer 42 and ground. Blanking signals, comprising a series of negative-going square waves 44, are applied through capacitor 46 to the control grid 22, although, as is well known, a positive-going square-wave blanking signal may be applied to the cathode 20 instead.

The signal electrode 14 is supplied through a load resistor 48 with a voltage positive with respect to the cathode. In accordance with the principles of the invention, means are provided for automatically varying that voltage to establish an optimum camera-tube condition and an optimum signal-voltage output despite fluctuations in scene-illumination.

The output of the camera tube includes a voltage developed across resistor 48 as a result of the flow of signal current therethrough. The amplitude of the signal current through load resistor 48 is a direct function, over a substantial range, both of the amount of light striking the photoconductive layer and of the voltage supplied to the signal electrode 14. Therefore, signal-current variations resulting from variations in object illumination can be reduced or eliminated by the provision of suitable means, such as those exemplarily disclosed herein, for automatically modifying the direct voltage applied to the signal electrode.

Figures 2A, 3:
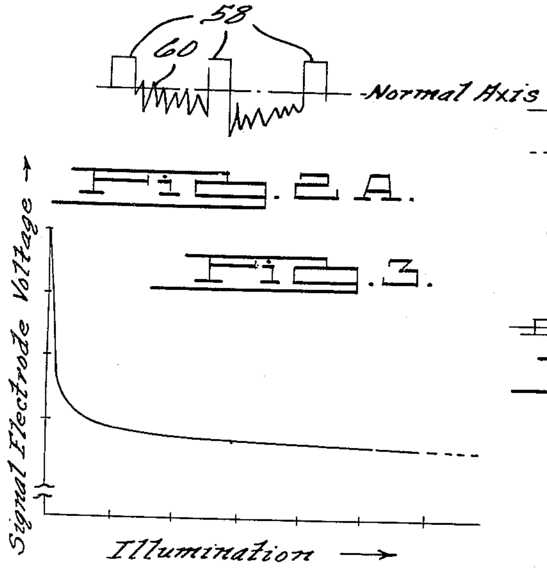
Figs. 2A, 2B and 2C are magnified representations of certain voltage-time relationships which may exist in a circuit of the type shown in Fig. 1.
Fig. 3 is a curve demonstrating how a control voltage may be caused to vary as a function of scene-illumination in the system shown in Fig. 1.

The signal voltage developed, in part, across load resistor 48 is applied through capacitor 50 to an amplifier 52 comprising, it is assumed, an even number of conventional video amplifier stages. Plate voltage for the final one of these stages (not shown) is supplied by positive battery 54 through variable load resistor 56. Under optimum conditions, the video signal voltage developed across load resistor 48 comprises, as is represented in Fig. 2A of the drawings, a series of pedestals 58 (inverted representations of the blanking signals) and an alternating-current camera signal represented at 60. Since the amplifier 52 is provided with an even number of video-amplifier stages, the output voltage signal as developed across the load resistor 56 and appearing on conductor 62 has the same polarity as the input voltage applied through capacitor 50. Therefore, the video signal represented in Fig. 2A may also be considered to be the signal appearing on conductor 62 under normal or optimum conditions. The representative direct-voltage reference level shown, labelled the "normal axis," is established by the value of the positive battery 54 and the direct-voltage drop across load resistor 56.

Figure 2B:
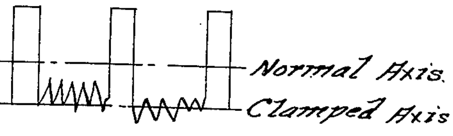
Figure 2C:
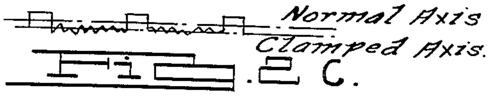

An exemplary video signal resulting from excessive illumination of the object, so that either the camera tube 10 or the amplifier 52 tends to be overloaded, is represented in Fig. 2B of the drawings, and an exemplary video signal resulting from insufficient illumination of the object is represented in Fig. 2C of the drawings. It will be recognized that the representations of Figs. 2A, 2B, and 2C are greatly magnified and exaggerated for clarity of presentation.

Means are provided including a clamping diode 64 and a rectifying diode 66 for developing at the control grid of a direct-voltage amplifier 68 a positive direct voltage, relative to ground, which is a function of the average peak-to-peak value of the video output signal appearing on conductor 62 over a presettable interval of time.

Thus, the video signal appearing on conductor 62 is applied through capacitor 70, which is preferably variable, to the cathode of diode 64, the anode of which is connected to a suitable source of negative potential 72 through variable resistor 74, battery 72 and resistor 74 being bypassed by capacitor 76. Upon the appearance at the cathode of diode 64 of any element of the signal voltage which is more negative than the value of battery 72, diode 64 will become conductive, producing a voltage drop across resistor 74. The parameters of the circuit are selected to establish an average direct voltage at the anode of tube 64, and hence at point 76, which is more positive than the potential of battery 72 by an amount determined by the average negative excursion of the video signal over a predetermined time interval, which is preferably in the order of several frames.

The positive excursions of the video signal applied through capacitor 70 are rectified by diode 66, so that a direct voltage is developed across capacitor 80 and resistor 82, both of which are preferably variable. As a result of the conjoint functioning of diodes 64 and 66, there appears at the cathode of diode 66 a direct voltage which is applied through resistor 84 to the control grid of triode 68, the amplitude of that voltage being a function of the average peak-to-peak value of the input video signal over, preferably, a period of several frames, the averaging or integrating period being determined by appropriate setting of the several variable elements in the diode circuits.

Triode 68 serves as a direct-voltage amplifier, the plate circuit of that triode being traceable from grounded positive battery 54, conductor 86, the lower portion of the resistive element and the brush of potentiometer 88, conductor 90, the resistive portion of potentiometer 92, and through tube 68 to ground. The amplitude of the direct current in that plate circuit is a direct function, and the value of the voltage of the anode of tube 68 is an inverse function, of the positive voltage appearing at the control grid of that tube. Hence, the direct voltage appearing at the anode of tube 68, resulting from the IR drop across the resistive elements of the aforesaid plate circuit for that tube, will be substantially lower than the voltage of battery 54 when a video signial of high peak-to-peak amplitude appears on conductor 62 as the result of an excessively illuminated object. On the other hand, the voltage at the anode of tube 68 will rise to a value approaching that of battery 54 when the video signal appearing on conductor 62 has a relatively low peak-to-peak amplitude resulting from excessively low levels of object illumination. The voltage appearing at the anode of tube 68 may be considered to constitute the supply voltage for the signal electrode 14 of the camera tube 10 since it is applied thereto through resistors 94 and 48.

It will be noted that the anode of tube 68 is connected to ground through capacitor 96, the resistive element of potentiometer 88 and battery 54, the values being selected to bypass to ground any rapidly varying components of the original video signal appearing at the anode of tube 68 but to preserve the slowly varying direct voltage appearing at the anode of that tube resulting from sensed changes in the illumination level. As will be apparent hereinafter, capacitor 96 also serves to obviate the possibility of alternating-current feedback from the output to the input of the camera tube 10.

It will therefore be seen that by virtue of the described circuitry, a direct voltage is applied to the signal electrode 14 which is an inverse function of an average value of the illumination of the object being televised. As was before noted, by virtue of such automatic variation of the signal-electrode potential, signal-current variations resulting from variations in object illumination are reduced or eliminated so that a substantially constant video wave may be maintained at the input of video amplifier 52.

The output of video amplifier 52 is applied, in the exemplarily disclosed closed-circuit system, by an extended conductor or interconnecting cable 98, through a video amplifier 100 located in a remotely positioned receiver; and through suitable conventional control circuitry (not shown) to the picture tube 104.

Pragmatically, it has been found that by virtue of the employment of the circuitry disclosed, changes in the illumination of the object over a range of 1,000 to 1 will produce a change in the signal electrode voltage of approximately 15 volts and an increase in the output video wave from the final video amplifier 100 of about four percent, which has been found to be substantially unnoticeable on the face of the picture tube 104.

Fig. 3 of the drawings, derived from experimental data, shows the relationship between illumination changes and variations in the signal-electrode voltage resulting from the application of the principles of the invention. At very low levels of illumination, e.g. under 50 or 60 lumens per square foot, the sensitivity of the tube tends to be insufficiently great to produce an adequate signal and consequently the bias circuits produce a very high voltage at the signal electrode, relatively speaking, in an effort to force the tube to produce an adequate output signal. Above that minimum value of illumination, however, a substantially constant signal-electrode voltage is produced despite very great or very abrupt changes in the illumination level.

As was before noted, potentiometer 42 is adjustable to provide an appropriate control grid 22 bias which is preferably set at an optimum value for the average or normal illumination levels. If the camera tube 10 is then subjected to exceedingly high levels of illumination, so that the voltage of the signal electrode 14 is reduced to a relatively low value, it may be desirable to render the control grid 22 more negative with respect to the cathode 20 in order to prevent any defocus of the picture due to the impingement of a relatively high-level beam on a low-potential target.

By shifting switch 40 into engagement with its No. 2 contact, this bias adjustment may not only be automatically accomplished, but also the control-grid-to-cathode bias may be continuously functionally related to the direct voltage applied to the signal electrode 14. Thus, since the resistive portion of potentiometer 92 is in the plate circuit of triode 68, the direct voltage at the brush of potentiometer 92 and upon conductor 106 will be continuously related to the voltage appearing at the anode of tube 68, and hence, to the voltage appearing at the signal electrode 14. Since under all operating conditions tube 68 is conductive, at any position of the brush of potentiometer 92 other than the position in which it is in engagement with the extreme upper end of the resistive element of potentiometer 92, the voltage appearing on conductor 106 will be greater than the signal-electrode voltage. The voltage on conductor 106 is applied through the No. 2 contact of switch 40 and through the resistive element of potentiometer 42 to ground, the brush of potentiometer 42 being connected to the control grid 22 of tube 10 through resistor 36, as before noted. By suitably adjusting potentiomerts 92 and 42, the control grid 22 of tube 10 may have applied thereto a voltage variable over a range from ground potential to a value substantially positive with respect to ground, it being recalled that the cathode 20 of tube 10 is at a potential substantially positive with respect to ground. Potentiometers 42 and 92 are preferably adjusted to provide optimum bias under the average or normal illumination conditions met in any given application of the shown system. To avoid the necessity of repeated adjustment during operation, the switch 40 is preferably placed in engagement with its No. 1 contact, and the potentiometer 42 adjusted to provide that optimum bias. Then, with a normally illuminated scene, switch 40 is shifted into engagement with its No. 2 contact and potentiometer 92 is adjusted to provide the same bias.

As a further refinement, means may be provided to modify the gain of the final video amplifier 100 in accordance with the average video signal output of tube 10. Thus, the direct voltage appearing on conductor 90, the amplitude of which is inversely related to the peak-to-peak value of the signal-voltage output of the tube 10 averaged over a selectable period of time, may, by closing switch 108, be applied through resistor 110, through switch 108 and via conductor 112 to the final video amplifier, appropriately to modify the gain of that amplifier.

Pentode 102 may be considered to be an element of one of the video amplifier stages in the final amplifier 100. The voltage appearing on conductor 112 may be applied, for example, to the screen grid of pentode 102 so as to modify the gain of that stage. By virtue of this arrangement, the output signal from the final amplifier 100 may be made to increase or decrease in order to present the maximum information in the light and dark areas of the reproduced scene.

As a further refinement, the signal appearing in the final amplifier 100 may also be employed to provide a direct potential at the control grid of tube 68, thereby to modify the potential of the signal electrode 14. Thus, by closing switch 114, the output of pentode 102 may be applied through capacitor 116 to a circuit 118 serving to develop across the resistive portion of potentiometer 120 a direct voltage which is a function of the average peak-to-peak value of the video signal appearing at the anode of tube 102 over a period of one or more frames, circuit 118 comprising, for example, a clamping and rectifying circuit identical to the clamping and rectifying circuit hereinbefore described. A selectable portion of the voltage appearing across the resistive element of potentiometer 120 is applied to the control grid of the triode 68 through an isolating resistor 122.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a television system, a camera tube having a signal electrode, a load element connected to said signal electrode, means for applying a direct voltage to said signal electrode through said load element, a series circuit including a capacitor a first rectifying element and a first resistor, a second series circuit comprising said first capacitor, a second rectifying element, a second resistor and said first resistor, a second capacitor connected in parallel with said second resistor, means for applying the signal voltage developed across said load element across both of said series circuits for developing a direct voltage across both of said first and second resistors, and means responsive to the direct voltage developed across both of said first and said second resistors for controlling the direct voltage applied to said signal electrode through said load element.

2. In a television system, a camera tube having a signal electrode, a load element connected to said signal electrode, means for applying a direct voltage to said signal electrode through said load element, a series circuit including a first capacitor a rectifying element and a first resistor, a second series circuit comprising said first capacitor, a second rectifying element, a second resistor and said first resistor, a second capacitor connected in parallel with said second resistor, means for applying the signal voltage developed across said load element across both of said series circuits for developing a direct voltage across both of said first and second resistors, an electron-discharge device, a load resistor for said device, means for applying the voltage developed across both of said first and said second resistors to said device for producing a direct voltage across said load resistor varying inversely with the variation of the direct voltage developed across said first and second resistors, and means connecting said load resistor to said load element.

3. In a television system, a camera tube having a signal electrode, means in said tube producing an electron beam directed at said signal electrode, means including said signal electrode for producing an output signal, means responsive to the average amplitude of said signal over a selected period of time for controlling the voltage applied to said signal electrode, and means responsive to the average amplitude of said signal over a selected period of time for controlling said electron-beam producing means.

4. In a television system, a camera tube having a signal electrode, means for applying to said tube an optical image of said variable brightness, means including said signal electrode for producing an output signal, the amplitude of said signal being a direct function of the brightness of the image and a direct function of a voltage applied to said signal electrode, means in said tube producing an electron beam directed at said signal electrode, means for applying to said signal electrode a voltage having an average amplitude over a selected period of time which is an inverse function of the average brightness of the image over that selected period of time, and means controlling said electron-beam producing means to varying the intensity of the beam as an inverse function of the average brightness of the image over that selected period of time.

5. In an industrial television system, a transmitter for producing an output signal containing both video and blanking information, said transmitter including a camera tube, means for applying to said tube an optical image of variable brightness, a receiver remote from said transmitter including a picture tube and an amplifier responsive to said transmitter output signal, a plurality of conductors interconnecting said transmitter and said receiver, and means including certain of said conductors for varying the gain of said amplifier as an inverse function of the average brightness of the image over a selectable interval of time.

6. In an industrial television system, a transmitter for producing an output signal containing both video and blanking information, said transmitter including a camera tube, a receiver remote from said transmitter including a picture tube and an amplifier responsive to said transmitter output signal, a plurality of conductors interconecting said transmitter and said receiver, and means including certain of said conductors for controlling the gain of said amplifier as an inverse function of the average amplitude of the output signal over a selectable interval of time.

7. In an industrial television system, a transmitter for producing an output signal containing both video and blanking information, said transmitter including a camera tube, a receiver remote from said transmitter including a picture tube and an amplifier responsive to said transmitter output signal, a plurality of conductors interconnecting said transmitter and said receiver, first circuit means including a pair of rectifying elements for developing a varying direct voltage the amplitude of which is a direct function of the average amplitude of the output signal over a selectable period of time, second circuit means for applying to said amplifier a direct voltage having an amplitude which varies as an inverse function of the varying direct voltage produced by said circuit means, and means including said first and second circuit means and one of said conductors for controlling the gain of said amplifier.

8. In an industrial television system, a camera tube having a signal electrode, means including said signal electrode for producing an output signal containing both video and blanking information, a receiver including a picture tube and an amplifier responsive to said output signal, a plurality of conductors interconnecting said transmitter and said receiver, circuit means including a pair of rectifying elements for developing a varying direct voltage the amplitude of which is a direct function of the average amplitude of the output signal over a selectable period of time, means including one of said conductors for applying to said amplifier a direct voltage having an amplitude which varies as an inverse function of the varying direct voltage produced by said circuit means, and means for applying to said signal electrode a direct voltage having an amplitude which varies as an inverse function of the varying direct voltage produced by said circuit means.

9. In an industrial television system, a transmitter for producing an output signal containing both video and blanking information, said transmitter including a camera tube, a receiver remote from said transmitter including a picture tube and an amplifier responsive to said transmitter output signal, a plurality of conductors interconnecting said transmitter and said receiver, certain of said conductors conducting said output signal to said amplifier, and means including certain of said conductors and said amplifier for controlling a voltage applied to said camera tube.

10. In an industrial television system, a transmitter for producing an output signal containing both video and blanking information, said transmitter including a camera tube having a signal electrode, a receiver remote from said transmitter including a picture tube and an amplifier responsive to said transmitter output signal, a plurality of conductors interconnecting said transmitter and said receiver, certain of said conductors conducting said output signal to said amplifier, and means including certain of said conductors and said amplifier responsive to said signal as received at said amplifier for controlling the voltage applied to said signal electrode.

11. In a television system, a transmitter for producing an output signal containing both video and blanking information, said transmitter including a camera tube having a signal electrode, means in said tube producing an electron beam directed at said signal electrode, a receiver remote from said transmitter including a picture tube and an amplifier responsive to said transmitter output signal, means including said amplifier responsive to the average amplitude of said signal over a selected period of time for controlling the voltage applied to said signal electrode, and means including said amplifier responsive to the average amplitude of said signal over a selected period of time for controlling said electron-beam producing means.

12. In a television system, a camera tube having an output-signal electrode, output-signal circuit means including said signal electrode for producing an alternating current output signal, means for applying a direct voltage to said signal electrode, the average amplitude of said alternating current output signal varying in response to the magnitude of said direct voltage, and means including rectifying means responsive to said alternating current output signal for producing a direct voltage signal having a magnitude which varies in accordance with the average amplitude of said alternating current output signal as averaged over a selected period of time in the order of several frames, and means responsive to said direct voltage signal for controlling the direct voltage applied to said signal electrode.

13. In a television system, a camera tube having an output-signal electrode for producing an alternating current output signal, means for applying to said tube an optical image of variable brightness, means comprising a variable voltage divider network including a resistor and a direct current amplifying device connected across a source of potential for applying a direct voltage to said signal electrode having a magnitude which varies in accordance with the magnitude of a direct voltage applied to said direct current amplifying device, the average amplitude of said alternating current output signal tending to vary in accordance with the magnitude of the direct voltage applied to said signal electrode and in accordance with the brightness of the image, and means including rectifying means responsive to said alternating current output signal for applying to said direct current amplifying device a direct voltage having an amplitude which varies in accordance with the average amplitude of said alternating current output-signal as averaged over a selected period of time in the order of several frames.

14. The combination of claim 13, in which said camera tube further has a cathode, in which said means for applying a direct voltage to said signal electrode further includes means connecting the junction of said resistor and said direct current amplifying device to said signal electrode, and further including means for connecting said direct current amplifying device in parallel with means including the signal electrode-cathode path of said camera tube with respect to said source of potential.

References Cited in the file of this patent

UNITED STATES PATENTS

| | | |
|---|---|---|
| 2,402,445 | Poch | June 18, 1946 |
| 2,451,640 | Thalner | Oct. 19, 1948 |
| 2,649,501 | Cope | Aug. 18, 1953 |
| 2,654,799 | Wendt | Oct. 6, 1953 |
| 2,786,960 | Palmer | Mar. 26, 1957 |